United States Patent [19]
Zimmermann

[11] Patent Number: 5,523,684
[45] Date of Patent: Jun. 4, 1996

[54] ELECTRONIC SOLENOID CONTROL APPARATUS AND METHOD WITH HALL EFFECT TECHNOLOGY

[75] Inventor: Daniel E. Zimmermann, Peoria, Ill.

[73] Assignee: Caterpillar Inc., Peoria, Ill.

[21] Appl. No.: 338,723

[22] Filed: Nov. 14, 1994

[51] Int. Cl.[6] .................. G01B 7/14; G01N 27/72; G01R 33/00; H01H 47/12
[52] U.S. Cl. .................. 324/207.22; 324/207.2; 324/226; 324/207.26; 361/179; 361/210; 340/686
[58] Field of Search ............. 324/207.2, 207.21, 324/207.22, 207.26, 226, 262; 361/152, 154, 160, 170, 179, 180, 210; 340/686

[56] References Cited

U.S. PATENT DOCUMENTS

| | | | |
|---|---|---|---|
| 4,434,450 | 2/1984 | Gareis | 361/152 |
| 4,450,427 | 5/1984 | Gareis | 338/32 |
| 4,656,400 | 4/1987 | Pailthorp et al. | 318/135 |
| 4,659,969 | 4/1987 | Stupak, Jr. | 318/128 |
| 4,665,348 | 5/1987 | Stupak, Jr. | 318/135 |
| 5,032,812 | 7/1991 | Banick et al. | 335/17 |
| 5,257,014 | 10/1993 | Zimmermann | 340/686 |
| 5,377,068 | 12/1994 | Kaylor et al. | 361/154 |

*Primary Examiner*—Walter E. Snow
*Attorney, Agent, or Firm*—David M. Masterson

[57] ABSTRACT

In one aspect of the present invention, an electromagnetic actuator is disclosed. The electromagnetic actuator includes a plunger adapted to move between first and second positions, a pull coil adapted to receive electrical energy and responsively produce a high electromagnetic force causing the plunger to move from the first position to the second position, and a hold coil adapted to receive electrical energy and responsively produce a low electromagnetic force for maintaining the plunger at the second position. A sensing device is included to detect the magnetic flux density produced by the coils and responsively produce a position signal having a magnitude responsive to the position of the plunger. Advantageously, signal conditioning circuitry receives the position signal, and de-energizes the pull coil in response to the position signal indicating that the plunger is at the second position.

8 Claims, 2 Drawing Sheets

Fig-1-

ELECTRONIC SOLENOID CONTROL APPARATUS AND METHOD WITH HALL EFFECT TECHNOLOGY

TECHNICAL FIELD

This invention relates generally to an apparatus for controlling the operation of a solenoid and, more particularly, to an apparatus for controlling the operation of a solenoid using a Hall effect sensor.

Background Art

Most diesel engine solenoids have two coils, a pull and hold coil, that are used to move the solenoid plunger from a first position to a second position. The pull coil provides a relatively high electromagnetic force to cause the plunger to move to the second position, while the hold coil provides a relatively low electromagnetic force to hold the plunger at the second position. A spring is used to bias the plunger to the first position in response to the coils being de-energized.

Because the pull coil consumes high power, it must be disconnected when the plunger is positioned at the second position. Prior art solenoid control circuitry uses mechanical switch contacts to disconnect the pull coil. However, switch contacts can easily fail. For example, such switch contacts are exposed to contaminants from engine oil. Consequently, when the contacts are opened to disconnect the pull coil, arcing may occur which causes the contacts to deteriorate rapidly. Thus, when the contacts are closed, they may transfer energy intermittently, thereby, causing solenoid failure.

The present invention is directed to overcoming one or more of the problems as set forth above.

Disclosure of the Invention

In one aspect of the present invention, an electromagnetic actuator is disclosed. The electromagnetic actuator includes a plunger adapted to move between first and second positions, a pull coil adapted to receive electrical energy and responsively produce a high electromagnetic force causing the plunger to move from the first position to the second position, and a hold coil adapted to receive electrical energy and responsively produce a low electromagnetic force for maintaining the plunger at the second position. A sensing device is included to detect the magnetic flux density produced by the coils and responsively produce a position signal having a magnitude responsive to the position of the plunger. Advantageously, signal conditioning circuitry receives the position signal, and de-energizes the pull coil in response to the position signal indicating that the plunger is at the second position.

BRIEF DESCRIPTION OF THE DRAWINGS

For a better understanding of the present invention, reference may be made to the accompanying drawings in which.

BEST MODE FOR CARRYING OUT THE INVENTION

Figure 1:
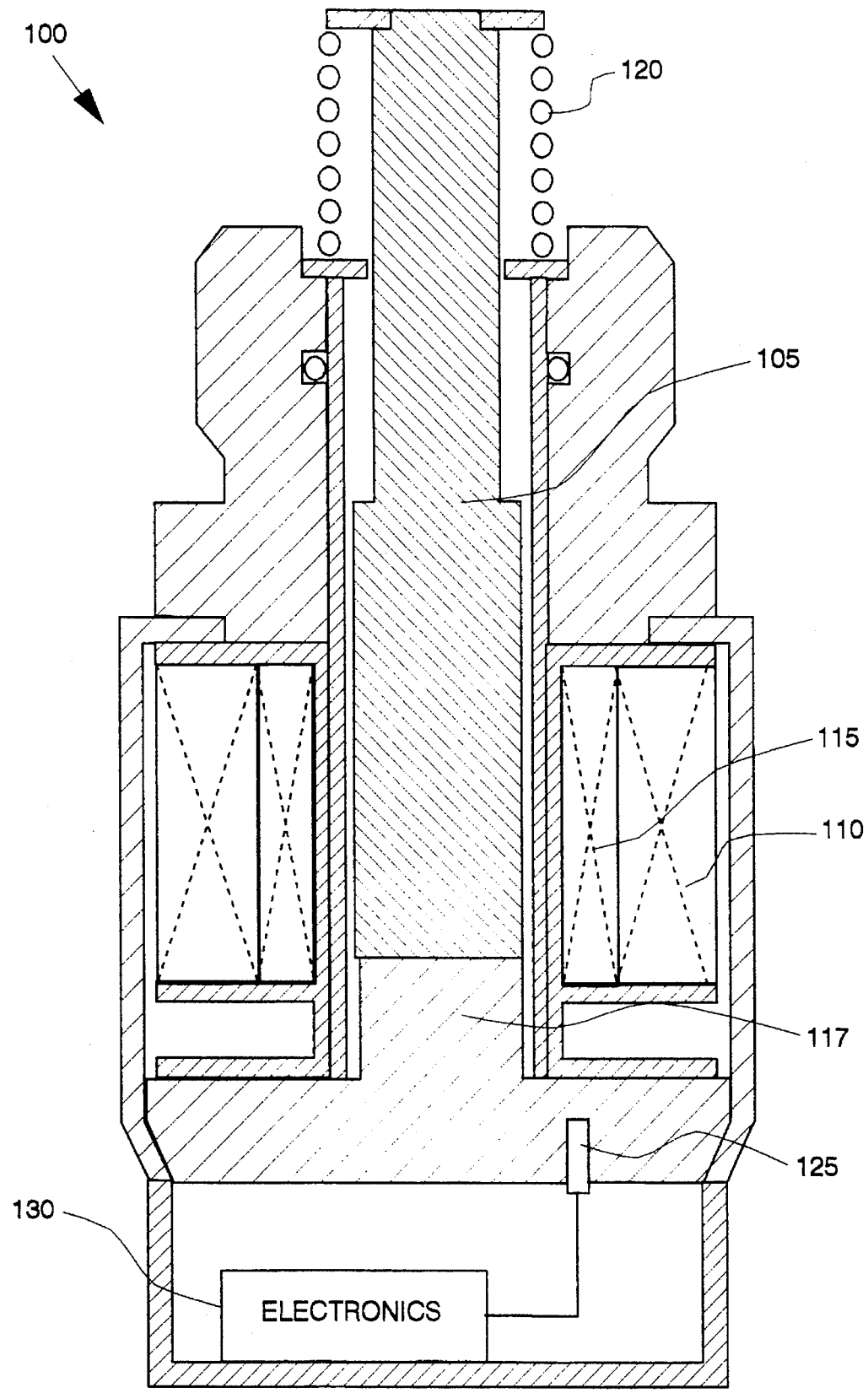
FIG. 1 shows a cross sectional view of a solenoid.

Reference is made to FIG. 1 which shows an electromagnetic actuator 100. A plunger 105 moves between first and second positions. (The plunger is shown to be in the second position.) A pull coil 110 produces a high electromagnetic force to cause the plunger to move from the first position to the second position. Once the plunger is positioned at the second position, a hold coil 115 which produces a low electromagnetic force, latches the plunger to the pole piece 117. A return spring 120 is used to return the plunger to the first position in response to the pull and hold coils being de-energized.

A sensing device 125 detects the magnetic flux density produced by the coils and responsively produces a position signal having a magnitude responsive to the position of the plunger. For example, the sensing device may include a Hall effect sensor. A signal conditioning means 130 is provided to controllably energize the pull coil in response to the magnitude of the sensed magnetic flux density. More particularly, the signal conditioning means de-energizes the pull coil in response to the position signal indicating that the plunger is at the second position.

Figure 2:
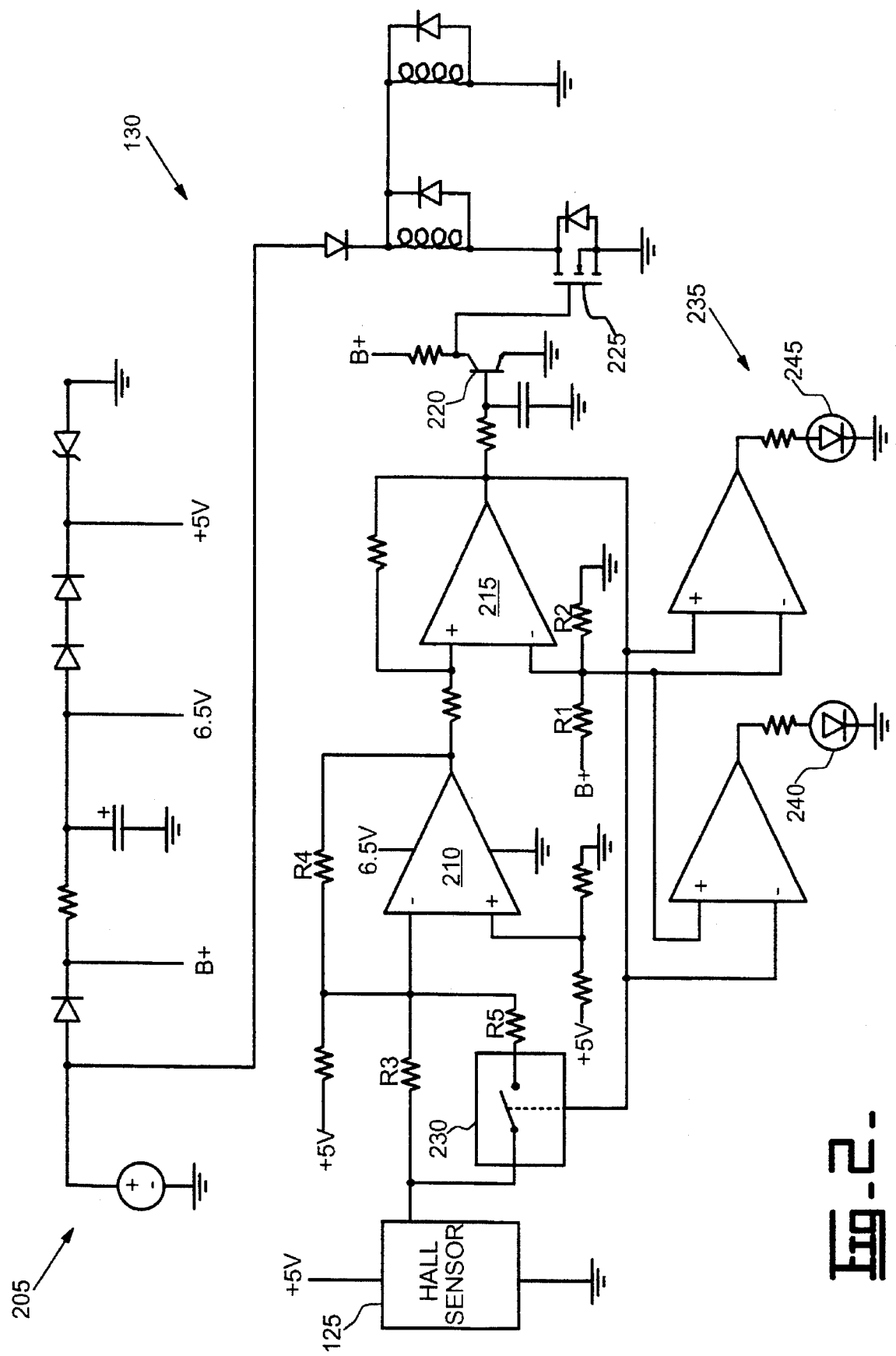
FIG. 2 shows the solenoid control circuity associated with the present invention.

Referring now to FIG. 2, the signal conditioning means 130 is shown in detail. A power means 205 produces an energization signal to energize the pull and hold coils. For example, the power means 205 may include a vehicle battery. The power means additionally provides energy to the various circuit elements of the signal condition means.

A variable gain amplifier 210 is provided to amplify the position signal. A comparator 215 compares the amplified position signal to a threshold voltage, and produces a comparison signal in response to the amplified position signal being greater than the threshold voltage. The threshold voltage is determined from a voltage divider made by R1 and R2. Note that, as the energy source (the vehicle battery) varies, the flux density produced by the coils varies proportionally. Advantageously, the threshold voltage is responsive to the varying energy source to accurately correspond to the position signal.

A BJT switch 220 is connected to the output of the comparator, and a CMOS switch 225 is connected between the pull coil and ground. The BJT switch is adapted to receive the comparison signal and responsively energize. In response to the BJT switch being energized, the gate of the CMOS switch is pulled low; thereby, de-energizing the CMOS switch. Accordingly, the current flow through the pull coil is stopped, which de-energizes the pull coil. Alternatively, in the absence of the comparison signal, the BJT switch becomes de-energized, which pulls the CMOS gate high. Accordingly, the CMOS switch energizes, which provide for current to flow through the pull coil.

An analog switch 230 is connected between the sensing device and the amplifier. Note that, the analog switch is controlled by the output of the comparator. For example, in the absence of the comparison signal, the switch opens to allow the position signal to pass through R3 to the amplifier. Accordingly, the position signal will be amplified by a gain R4/R3.

Alternately, in response to receiving the comparison signal, the analog switch closes to allow the position signal to pass through R5 to the amplifier. Thus, the position signal will be amplified by an appreciably higher gain of:

$$\frac{R4}{\frac{R3*R5}{R3+R5}}$$

where R3 is 15K Ohms, R4 is 100K Ohms, and R5 is 100 Ohms.

An indicating means 235 is provided to display the state of the pull and hold coil. For example, a red LED 240 is biased in response to both the pull and hold coils being energized, while a green LED 245 is biased in response to only the hold coil being energized.

Thus, while the present invention has been particularly shown and described with reference to the preferred embodiment above, it will be understood by those skilled in the art that various additional embodiments may be contemplated without departing from the spirit and scope of the present invention.

Industrial Applicability

The operation of the present invention is now described to illustrate the features and advantages associated with the present invention.

In response to the energization signal being produced, both the pull and hold coils become energized to cause the plunger to move from the first to the second position. However, once the plunger reaches the second position, the pull coil is de-energized while the hold coil remains energized to maintain the plunger at the second position. Once the energization signal is ceases to be produced, both coils become de-energized and the return spring returns the plunger back to the first position.

The present invention utilizes solid-state switching circuitry in combination with Hall effect technology to control the operation of the solenoid. For example, as electromagnetic forces of the energized coils cause the plunger to move from the first position to the second position, the flux density sensed by the Hall effect sensor increases in magnitude until the plunger reaches the second position. Once the plunger reaches the second position, the voltage value of the amplified position signal exceeds the threshold voltage, resulting in the pull coil to de-energize.

Because the magnitude of the flux density, and thus, the position signal reduces (due to the pull coil being de-energized), the gain of the amplifier increases to provide the amplified position signal with sufficient magnitude for comparison with the threshold voltage. Thus, when the amplified position signal falls below the threshold voltage, the pull coil is once again energized. This may occur, for example, when a heavy shock load causes the plunger to dislodge from the pole piece. Advantageously, the present invention automatically provides for the pull coil to be re-energized in order to bring the plunger back to the second position in response to harsh operating conditions.

Other aspects, objects and advantages of the present invention can be obtained from a study of the drawings, the disclosure and the appended claims.

I claim:

1. An electromagnetic actuator, comprising:
   a plunger adapted to move between first and second positions;
   a pull coil adapted to receive electrical energy and responsively produce a high electromagnetic force causing the plunger to move from the first position to the second position;
   a hold coil adapted to receive electrical energy and responsively produce a low electromagnetic force for maintaining the plunger at the second position;
   a sensing device adapted to detect the magnetic flux density produced by the coils and responsively produce a position signal having a magnitude responsive to the position of the plunger; and
   signal conditioning means for receiving the position signal, amplifying the position signal, de-energizing the pull coil in response to the amplified position signal indicating that the plunger is at the second position, further amplifying the position signal in response to the pull coil being de-energized, and re-energizing the pull coil in response to the further amplified position signal indicating that the plunger is at the first position.

2. An electromagnetic actuator, as set forth in claim 1, wherein the signal conditioning means includes:
   a variable gain amplifier for amplifying the magnitude of the position signal;
   a comparator for comparing the amplified position signal magnitude to a threshold voltage, and producing a comparison signal in response to the amplified position signal being greater than the threshold voltage; and
   a switch being connected between the pull coil and ground, and adapted to stop the flow of current through the pull coil to de-energize the pull coil in response the comparison signal being produced.

3. An electromagnetic actuator, as set forth in claim 2, wherein the signal conditioning means further includes:
   means for increasing the gain of the variable gain amplifier to further amplify the position signal magnitude in response to the production of the comparison signal;
   thereafter, the comparator stopping the production of the comparison signal in response to the amplified position signal being lessor than the threshold voltage; and
   wherein the switch initiates the flow of current through the pull coil to re-energize the pull coil in response to absence of the comparison signal.

4. A method for operating an electromagnetic actuator, the actuator including a plunger adapted to move between first and second positions, a pull coil adapted to receive electrical energy and responsively produce a high electromagnetic force causing the plunger to move from the first position to the second position, a hold coil adapted to receive electrical energy and responsively produce a low electromagnetic force for maintaining the plunger at the second position, comprising the steps of:
   detecting the magnetic flux density produced by the coils and responsively producing a position signal having a magnitude responsive to the position of the plunger; and
   receiving the position signal, amplifying the position signal, de-energizing the pull coil in response to the amplified position signal indicating that the plunger is at the second position, further amplifying the position signal in response to the pull coil being de-energized, and re-energizing the pull coil in response to the further amplified position signal indicating that the plunger is at the first position.

5. A method, as set forth in claim 4, including the following steps:
   amplifying the magnitude of the position signal;
   comparing the amplified position signal magnitude to a threshold voltage, and producing a comparison signal in response to the amplified position signal being greater than the threshold voltage; and
   de-energizing the pull coil in response the comparison signal being produced.

6. A method, as set forth in claim 5, including the following steps:
   increasing the gain of the variable gain amplifier to further amplify the position signal magnitude in response to the production of the comparison signal;
   thereafter, stopping the production of the comparison signal in response to the amplified position signal being lessor than the threshold voltage; and re-energizing the pull coil in response to absence of the comparison signal.

7. An electromagnetic actuator, as set forth in claim 3, wherein the threshold voltage is responsive to the energy source that produces the energization signal.

8. An electromagnetic actuator, as set forth in claim 7, including a spring for returning the plunger back to the first position in response to the coils being de-energized.

* * * * *